Aug. 18, 1959  A. T. NOGRADY, SR  2,899,845
DIFFERENTIAL GEAR
Filed Sept. 9, 1957  2 Sheets-Sheet 2

Inventor
Andor T. Nogrady, Sr.
By
Schroeder, Hofgren, Brady & Wegner
Attorneys

United States Patent Office 2,899,845
Patented Aug. 18, 1959

2,899,845

DIFFERENTIAL GEAR

Andor T. Nogrady, Sr., Port Washington, Wis.

Application September 9, 1957, Serial No. 682,834

12 Claims. (Cl. 74—711)

This invention relates to a differential gear mechanism and more particularly to a positive drive differential, i.e. one which is capable of only certain desired types of differential motion between the elements.

The need for a positive drive differential is particularly acute in the automotive field. With the standard differential used in most automobiles, trucks, tractors or the like, the motion of one of the driven wheels is completely independent of the motion of the other. Thus, if one of the driven wheels is on a slippery surface, such as ice or mud, and the other is on a solid surface, all of the power from the engine is transmitted to the wheel on the slippery surface and the wheel on the solid surface does not turn. This makes it extremely difficult to extricate the vehicle. Another problem with the standard differential, and one which is probably more dangerous, arises when the vehicle hits a slick spot in the road or goes over a bump lifting a wheel, but in such a manner that only one of the wheels is affected. The wheel which is on the slick surface or which leaves the ground speeds up as there is no resistance to its movement, and when it again comes in contact with a firm surface it is rotating faster than the vehicle is being moved and has a tendency to cause the car to swerve, when that wheel again has traction. In some cases this may be enough to throw the car completely out of the control of the driver.

Many types of frictional thrust differentials have been known in the past. However, they have generally required more parts than the standard differential or have used custom designed parts, as specially shaped gear teeth or the like. In any event, they have been substantiallly more expensive than the standard differential and have not been used widely because of the expense and because excessive frictional forces developed in them cause the parts to wear rapidly in use.

It is a principal object of the present invention to provide a new positive drive differential without extra elements and without elements of special design.

One feature of the invention is the provision of a differential in which the driven bevel gears are displaced from the axis about which they rotate, i.e. the pitch cone axes of the bevel gears are displaced from the axes of rotation thereof. Another feature is that the angle of displacement is less than the gear tooth pressure angle of the gears used.

A further feature is that a pair of bevel pinion gears interconnect the bevel gears, and the bevel gears have twice as many teeth as the bevel pinion gears. Still another feature is that the bevel pinion gears are rotatable on a common axis and are supported for oscillatory movement about another axis generally normal to the axis of rotation thereof. Yet another feature is the provision of means defining a clutch surface for the bevel gears. Still a further feature is that the housing in which the bevel gears and bevel pinion gears are mounted provides the clutch surface.

Another feature is that the clutch surface is provided with lubrication channels formed on arcs struck about a plurality of centers offset about the axis of rotation of the bevel gears.

Further features and advantages will readily be apparent from the following specification and from the drawings, in which:

Figure 3 is a diagrammatic showing of the arrangement of the lubricating channels in the clutch surface.

Although the positive drive differential disclosed herein was conceived for use in the automotive field and it is believed that it will find its principal use in this field, it is to be understood that it may also be used to adtage in other mechanisms utilizing differentials, as mechanical computers.

Figure 1:
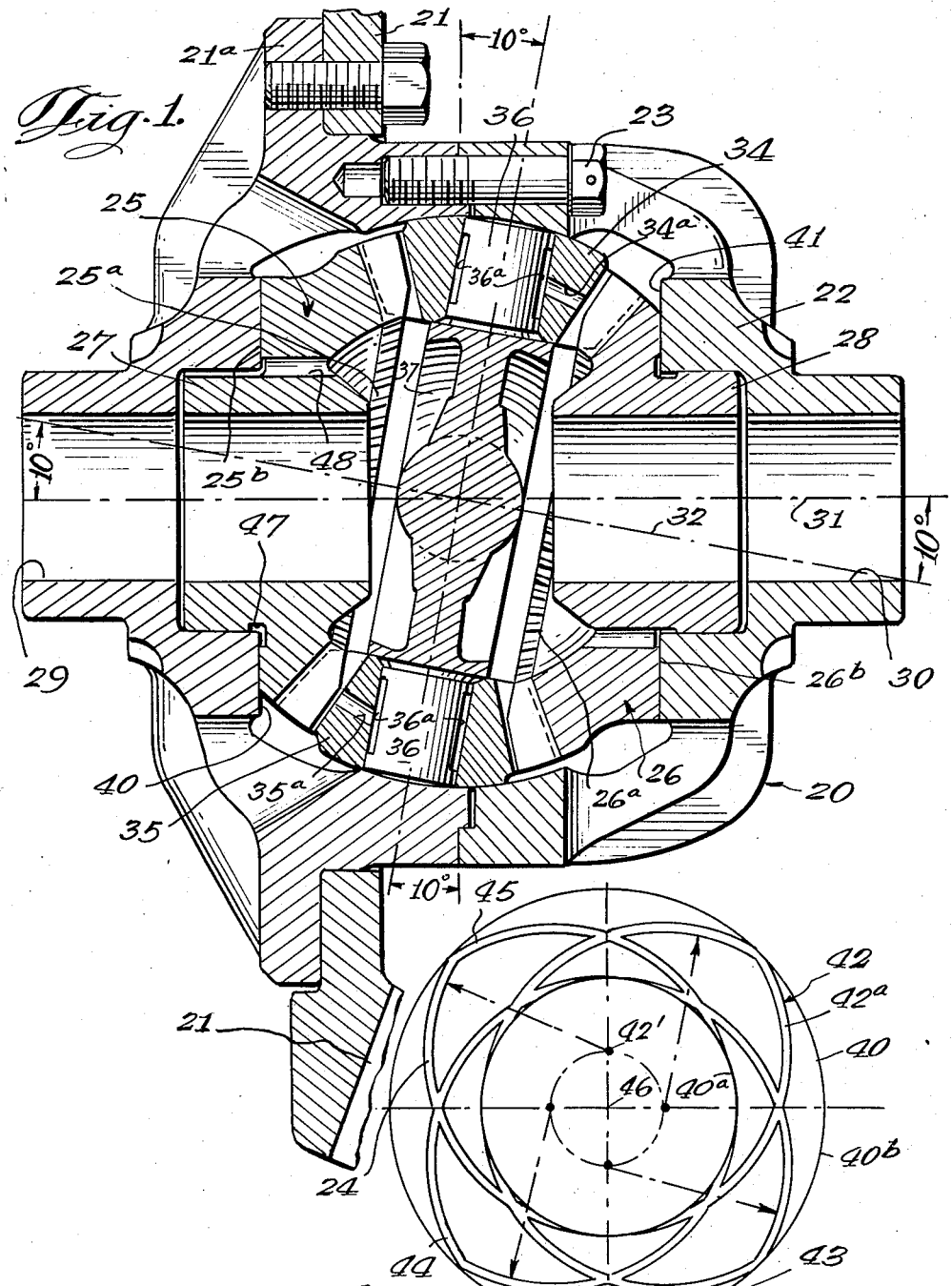
Figure 1 is a sectional view of the differential taken through the axis of rotation of the bevel gears.

Turning now to Figure 1 of the drawings, a differential embodying the invention is shown. The differential includes an outer housing or frame 20 comprising two sections 21 and 22 which are secured together, as by cap screws 23. A ring gear 24 is secured to a peripheral flange 21a surrounding housing member 21 and may be meshed with a suitable gear, not shown, for driving the differential, as from the drive shaft of an automobile. Carried within the housing 20 are a pair of driven bevel gears 25 and 26 each of which is provided with an annular toothed portion 25a and 26a, respectively. A hub portion 27 and 28 is formed on each of the gears 25 and 26 and each is drilled to receive an element to be driven by the bevel gears 25 and 26, as an axle (not shown). The hubs 27 and 28 are aligned with openings 29 and 30, respectively, in the differential housing 20, through which the driven elements may extend. It is apparent from the drawings that driven bevel gears 25 and 26 both rotate about a single axis 31 extending through the differential housing. The toothed portions 25a and 26a of the bevel gears, which are parallel in the position of the elements shown in Figure 1, are formed about an axis 32 which is at an angle from the axis 31.

Figure 2:
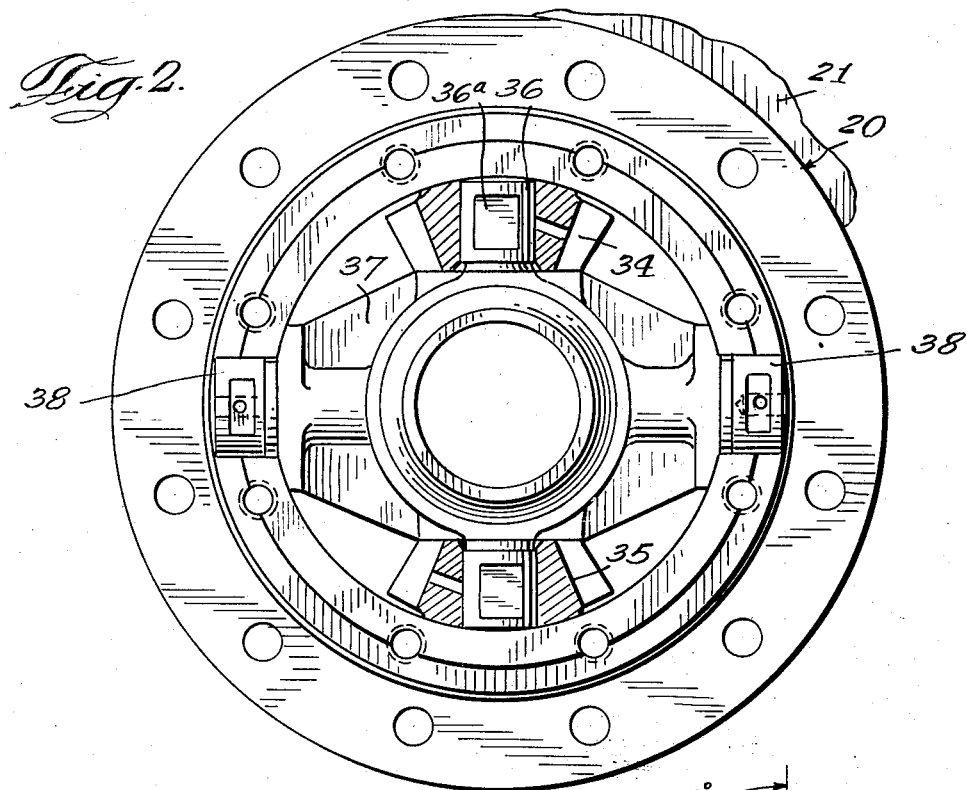
Figure 2 is a view looking from the right of Figure 1 with the housing and right-hand bevel gear removed.

Interconnecting the driven bevel gears 25 and 26 are a pair of bevel pinions 34 and 35 which are freely rotatable on a pair of aligned stub shafts 36 forming a part of an oscillatable mounting member 37. As best seen in Figure 2, mounting member 37 is journalled in bearings 38 carried by the differential housing 20. This mounting permits the member 37 and the bevel pinion gears 34 and 35 to oscillate about an axis which is perpendicular to both the axis of rotation 31 of the driven bevel gears 25 and 26 and the axis of rotation of the bevel gears 34 and 35.

Briefly, power is transmitted from the ring gear 24 through the differential housing 20, member 37, and bevel pinion gears 34 and 35 to the driven bevel gears 25 and 26 and thus to the driven elements which are connected thereto. When there is no differential action between the driven bevel gears 25 and 26, all of the parts maintain the same relative positions. With a desired differential action, for example, in an automobile going around a corner the inside wheel must travel slower than the differential drive by an amount equal to the speed-up of the outside wheel, the bevel pinion gears 34 and 35 and their mounting member 37 oscillate back and forth as bevel gears 25 and 26 rotate relative to the housing 20, permitting the required differential action. The motion of the pinions when desired differential action is occurring follows the pitch lines of the bevel gears. The axes of the pitch lines of the bevel gears describe conical paths about the axis of rotation 31. If, however, one of the driven bevel gears has a tendency to move without relative movement of the other, as would be the case where one of the wheels is on ice and the other on a solid surface, the bevel pinion gears become disoriented on the pitch line motion between the bevel drive gears, forcing them outwardly so that the clutch faces 25b and 26b on the rear surfaces of the bevel gears 25 and 26, respectively, are thrust against the clutch surfaces 40 and 41 on the interior of the housing 20. This clutches the driven bevel gears 25 and 26 with the differential housing 20, causing both of the gears to move at the same speed and thus the elements driven thereby to be turned equally. This brief description is intended merely to outline the operation of the differential and will be amplified in connection with the description of subsequent figures.

The clutch surfaces 40 and 41, of the housing 20, are provided with a special lubricating arrangement illustrated in Figure 3. A plurality of shallow arcuate grooves are provided in the clutch surface for conducting streams of oil about the surface, permitting a film of oil to spread evenly thereover. Four channels, 42, 43, 44 and 45 are provided, each being separated into two segments, as the segments 42a and 42b of channel 42. The channels are preferably portions of arcs of circles formed about the centers offset from the center 46 of the annular clutch surface 40. Thus, the channel 42 is formed about the center 42', the channel 43 about the center 43', channel 44 about the center 44' and channel 45 about the center 45'. These centers are preferably located half way between the center 46 of the annular clutch surface 40 and the inner edge 40a of the surface, so that each segment of a channel passes from the outer circumference 45 of the clutch surface to the inner edge thereof and intercepts two other channels. This provides thorough distribution of lubricant over the surface, reducing friction when the bevel gears are rotating under normal pressure with respect to the differential housing 20 and permitting a rapid escape of the lubricant when the bevel gears are forced outwardly against the clutch surfaces to clutch therewith. Lubrication of the entire differential assembly is further facilitated by an annular channel 47 around the hub of bevel gear 25 at its juncture with bearing surface 25b and a passageway, as at 48, through the bevel gear. Similar channels and passageways are provided in bevel gear 26. Lubrication of the bevel pinion gears is insured by flats 36a on stub shafts 36 and passageways 34a and 35a through the gears 34 and 35.

Figures 4, 5, 6:
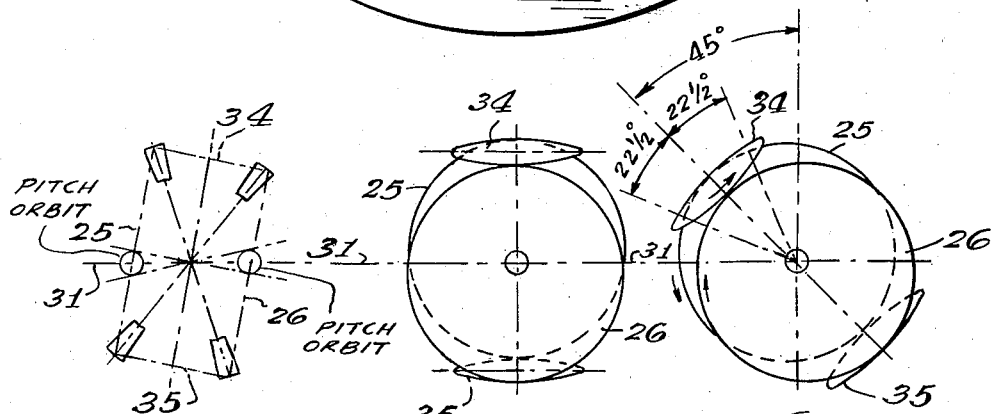
Figures 4, 5 and 6 are diagrams of the pitch surfaces of the gears of the differential, illustrating the motions thereof.

Turning now to Figures 4–6, the movements of the gears will be described with the aid of simplified pitch surface diagrams of the gears. In Figure 4, the driven bevel gears 25 and 26 and bevel pinion gears 34 and 35 are shown in the same relative positions as they have in Figure 1. The surfaces of gears 25 and 26 are parallel and the bevel pinion gears lie along an axis inclined from the vertical.

Figure 5 is a projection from Figure 4, showing the pitch surfaces as viewed from the right in Figure 4. When both driven bevel gears 25 and 26 move equally in the same direction, as when a vehicle is travelling along a straight path, the parts of the differential assembly remain in fixed position relative to each other. Figure 6 is a view similar to Figure 5, showing the gears shifted in position and indicating the directions of rotation during desired differential action, i.e. with one driven bevel gear advancing, and the other retarding by an equal amount, as when a vehicle turns a corner.

So long as this equal and opposite differential action continues, bevel pinion gears 34 and 35 rotate as indicated and oscillate about the axis through bearings 38, following the pitch lines of the driven bevel gears. Should the differential motion of the driven bevel gears have a tendency to vary from that desired, the bevel pinion gears 34 and 35 become improperly oriented with respect to the bevel gears 25 and 26, thrusting the clutch faces 25b and 26b on the bevel gears against clutch surfaces 40 and 41, and the differential acts as a direct drive, turning both of the driven bevel gears equally.

To permit the desired equal and opposite differential action, the pinion gears 25 and 26 must have twice as many teeth as the bevel pinion gears 34 and 35, a ratio of two to one. Any other ratio will result in the bevel pinion gears overrunning the driven bevel gears and becoming inoperative.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a positive drive differential: a housing; a pair of bevel gears mounted in said housing for rotation about an axis, the axis of the pitch circles of the bevel gears describing conical orbits about said rotational axis; and bevel pinion gears interconnecting said bevel gears and mounted to oscillate in said housing in accordance with movement of said bevel gears, the tooth ratio of said bevel gears to said bevel pinion gears being two to one.

2. In a positive drive differential: a pair of bevel gears, each having an axis; means defining an axis of rotation for each of said bevel gears, said gear axes being at an angle to said axes of rotation; and bevel pinion gear means interconnecting said bevel gears.

3. In a positive drive differential: a pair of bevel gears each defining a pitch cone with an axis; means defining an axis of rotation for each of said bevel gears, the axes of rotation being aligned, and the pitch cone axes of the gears being at an angle to the axes of rotation; and bevel pinion gear means interconnecting said bevel gears.

4. In a positive drive differential: a pair of bevel gears each having an axis; means defining an axis of rotation for each of said bevel gears, said gear axes being at an angle to said axis of rotation; and a pair of bevel pinion gears interconnecting said bevel gears, the tooth ratio of said bevel gears to said pinion gears being two to one.

5. In a positive drive differential: a pair of bevel gears each having an axis; means defining an axis of rotation for each of said bevel gears offset from the axes of the gears; a pair of opposed bevel pinion gears rotatable on a common axis, interconnecting said bevel gears; and means for supporting said bevel pinion gears for movement about an axis generally normal to the axis of rotation of the bevel gears and to the axis of rotation of the bevel pinion gears.

6. In a positive drive differential: a pair of driven bevel gears, each having means for making a driving connection thereto, said means being aligned along a common axis, the axis of each of said bevel gears being displaced from said common axis; bevel pinion gear means interconnecting said bevel gears; and means for making a driving connection to said bevel pinion gears.

7. In a positive drive differential: a pair of bevel gears each having an axis; means defining an axis of rotation for each of said bevel gears, said gear axes being at an angle to said axes of rotation; bevel pinion gear means interconnecting said bevel gears; and means defining clutch surfaces for said bevel gears.

8. In a positive drive differential: a pair of bevel gears, each having means for making a driving connection thereto, said means being aligned along a common axis and the axis of each of said gears being displaced from said common axis; bevel pinion gear means interconnecting said bevel gears; a frame for mounting said bevel gears and said bevel pinion gear means, said frame including means defining a clutch surface for each of said bevel gears.

9. In a posititive drive differential: a housing; a ring gear on said housing, for driving the housing; a pair of driven bevel gears mounted in said housing, each having means for making a driving connection thereto, said means being aligned along a common axis, the axis of each of said gears being at an angle to said common axis; a pair of bevel pinion gears rotatable on an axis, interconnecting said bevel gears; means for supporting said bevel pinion gears for oscillation about an axis generally normal both to the axis of rotation thereof and to said common axis; and clutch surfaces in said housing adjacent each of said driven bevel gears.

10. In a positive drive differential: a housing; a ring gear on said housing, for driving the housing; a pair of driven bevel gears mounted in said housing, each having means for making a driving connection thereto, said means being aligned along a common axis, the axis of each of said gears being displaced from said common axis; a pair of bevel pinion gears rotatable on an axis, and interconnecting said bevel gears; means for supporting said bevel pinion gears for oscillation about an axis generally normal both to the axis of rotation thereof and to said common axis; and clutch surfaces in said housing adjacent each of said driven bevel gears, said surfaces having a plurality of lubricating channels therein.

11. In a positive drive differential: a housing; a ring gear on said housing, for driving the housing; a pair of driven bevel gears mounted in said housing, each having means for making a driving connection thereto, said means being aligned along a common axis, the axis of each of said gears being displaced from said common axis; a pair of bevel pinion gears rotatable on an axis, and interconnecting said bevel gears; means for supporting said bevel pinion gears for oscillation about an axis generally normal both to the axis of rotation thereof and to said common axis; and clutch surfaces in said housing adjacent each of said driven bevel gears, said surfaces having a plurality of lubricating channels therein, said lubrication channels being arcuate in shape and formed about a plurality of centers offset from said common axis.

12. A positive drive differential gearing comprising: a driven differential housing; axle sections extending from said housing; a pair of aligned bevel gears mounted within said housing and connected with said axle sections, the pitch circles of the teeth of said bevel gears rotating in an angular orbit with relation to the axle sections and said housing; and oscillating, positive drive bevel pinion gears in said housing, meshed with said bevel gears.

References Cited in the file of this patent
UNITED STATES PATENTS

| | | |
|---|---|---|
| 1,053,740 | McReynolds | Feb. 18, 1913 |
| 1,174,941 | Bache | Mar. 7, 1916 |
| 1,235,249 | Salfishberg | July 31, 1917 |
| 1,487,073 | Nogrady | Mar. 18, 1924 |